US010541958B2

(12) United States Patent
Tal et al.

(10) Patent No.: US 10,541,958 B2
(45) Date of Patent: Jan. 21, 2020

(54) CONTROLLING A DEVICE CLOUD

(71) Applicant: Facebook, Inc., Menlo Park, CA (US)

(72) Inventors: Eran Tal, San Jose, CA (US); Martin Rehwald, Mountain View, CA (US); Francislav Penov, Kirkland, WA (US); Siyin Yang, Mercer Island, WA (US); Damian Kowalewski, Sunnyvale, CA (US); Georgiy Yakovlev, Pacifica, CA (US); Anupma Chhabra, Fremont, CA (US); Zachary Chee-Ping Lawrence, College Park, MD (US); Rizwan Ahmad, Menlo Park, CA (US); Dung Nguyen Tien, Newport News, VA (US); Angelica Estefania Escareno, San Francisco, CA (US); Aidymar Bigio, Hillsborough, CA (US); Sridhar Rao, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 206 days.

(21) Appl. No.: 15/227,999

(22) Filed: Aug. 4, 2016

(65) Prior Publication Data
US 2017/0041271 A1   Feb. 9, 2017

Related U.S. Application Data

(60) Provisional application No. 62/201,496, filed on Aug. 5, 2015.

(51) Int. Cl.
*H04L 12/58*   (2006.01)
*H04L 29/08*   (2006.01)
(Continued)

(52) U.S. Cl.
CPC .............. *H04L 51/18* (2013.01); *H04L 12/66* (2013.01); *H04L 43/045* (2013.01);
(Continued)

(58) Field of Classification Search
CPC .. G05B 2219/2642; G05B 2219/25168; G10L 15/22; G10L 15/1822; G10L 15/30;
(Continued)

(56) References Cited

U.S. PATENT DOCUMENTS 8,024,487 B2   9/2011   Bhanu
8,121,109 B2 *   2/2012   Sibileau ................ H04L 12/282
                                                          370/349
(Continued)

FOREIGN PATENT DOCUMENTS

GB            2 454 583 A      5/2009
WO   WO 2006/065996 A2 *   6/2006  ............. H04L 29/06
(Continued)

OTHER PUBLICATIONS

Communication, European Search Report, Annex to the European Search Report, European Patent Office, Patent Application No. EP 16 18 3055, dated Nov. 21, 2016.
(Continued)

*Primary Examiner* — Patrice L Winder
(74) *Attorney, Agent, or Firm* — Van Pelt, Yi & James LLP

(57) ABSTRACT

In one embodiment, a method includes receiving a command message from a client device associated with a user; parsing the command message; identifying, based on the parsed command message, one or more of a number of connected devices; determining, based on the parsed command message, one or more instructions for the identified connected devices; and providing the instructions to the identified connected devices.

20 Claims, 7 Drawing Sheets

(51) Int. Cl.
*H04L 12/26* (2006.01)
*H04L 12/66* (2006.01)

(52) U.S. Cl.
CPC .......... *H04L 43/065* (2013.01); *H04L 51/32* (2013.01); *H04L 67/327* (2013.01)

(58) Field of Classification Search
CPC ....... H04L 12/2803–2847; H04L 51/18; H04L 51/32; H04L 43/065; H04L 43/045; H04L 67/327; H04L 67/10; H04L 63/10; H04L 63/08; H04L 12/66; G06Q 50/01; G06Q 10/10
See application file for complete search history.

(56) References Cited

U.S. PATENT DOCUMENTS

| | | | |
|---|---|---|---|
| 8,499,245 B1 | 7/2013 | Froment | |
| 8,554,559 B1* | 10/2013 | Aleksic | G10L 15/30 704/235 |
| 8,825,020 B2* | 9/2014 | Mozer | H04L 12/282 379/102.01 |
| 9,047,271 B1 | 6/2015 | Mengibar | |
| 9,207,659 B1* | 12/2015 | Sami | H04L 12/2829 |
| 9,305,554 B2* | 4/2016 | Jagatheesan | G10L 15/32 |
| 9,378,467 B1* | 6/2016 | Chaiyochlarb | G06N 5/047 |
| 9,398,490 B2 | 7/2016 | Vanderzee | |
| 9,413,827 B2* | 8/2016 | Sharma | H04L 67/12 |
| 9,451,434 B2* | 9/2016 | Baldwin | H04W 4/029 |
| 9,465,369 B2* | 10/2016 | Saha | G05B 1/01 |
| 9,489,616 B2* | 11/2016 | Sharma | G06N 3/006 |
| 9,563,431 B2 | 2/2017 | Tamir | |
| 9,565,172 B2 | 2/2017 | Ståhl | |
| 9,590,818 B2* | 3/2017 | Capuozzo | H04L 12/2814 |
| 9,654,434 B2* | 5/2017 | Sone | H04L 51/16 |
| 9,767,091 B2* | 9/2017 | Sarikaya | G06F 17/2765 |
| 10,091,272 B2* | 10/2018 | Cho | H04W 4/12 |
| 10,116,596 B2* | 10/2018 | Li | H04L 51/02 |
| 10,181,960 B2* | 1/2019 | Kim | H04L 12/2829 |
| 10,274,911 B2* | 4/2019 | Uppala | G10L 15/22 |
| 2001/0041980 A1 | 11/2001 | Howard | |
| 2003/0078032 A1* | 4/2003 | Pei | G08C 17/02 455/411 |
| 2005/0037708 A1 | 2/2005 | Torvinen | |
| 2005/0044225 A1* | 2/2005 | Ota | H04L 29/06 709/225 |
| 2005/0096913 A1 | 5/2005 | Coffman | |
| 2006/0053229 A1 | 3/2006 | Choi | |
| 2008/0268882 A1* | 10/2008 | Moloney | H04L 51/18 455/466 |
| 2009/0204578 A1 | 8/2009 | Dang | |
| 2010/0263032 A1 | 10/2010 | Bhuyan | |
| 2011/0098029 A1 | 4/2011 | Rhoads | |
| 2011/0106779 A1 | 5/2011 | George | |
| 2011/0173542 A1* | 7/2011 | Imes | H04W 4/80 715/735 |
| 2011/0252240 A1 | 10/2011 | Freedman | |
| 2013/0006903 A1 | 1/2013 | Vishwakarma | |
| 2013/0065584 A1 | 3/2013 | Lyon | |
| 2013/0080520 A1 | 3/2013 | Kiukkonen | |
| 2013/0080898 A1* | 3/2013 | Lavian | G06F 3/16 715/728 |
| 2013/0124194 A1 | 5/2013 | Nadal | |
| 2013/0254315 A1 | 9/2013 | Solyanik | |
| 2013/0283358 A1 | 10/2013 | Manroa | |
| 2013/0285800 A1 | 10/2013 | Liu | |
| 2013/0305330 A1 | 11/2013 | Palanigounder | |
| 2014/0041055 A1 | 2/2014 | Shaffer | |
| 2014/0090034 A1 | 3/2014 | Fyke | |
| 2014/0109835 A1 | 4/2014 | Colvin | |
| 2014/0120901 A1* | 5/2014 | Ward et al. | H04W 4/001 455/419 |
| 2014/0164611 A1 | 6/2014 | Molettiere | |
| 2014/0172123 A1* | 6/2014 | Lee | G05B 15/02 700/17 |
| 2014/0188935 A1 | 7/2014 | Vee | |
| 2014/0201133 A1 | 7/2014 | Kawabata | |
| 2014/0330809 A1 | 11/2014 | Raina | |
| 2014/0359018 A1 | 12/2014 | Sun | |
| 2014/0369275 A1 | 12/2014 | Fleck | |
| 2015/0019553 A1 | 1/2015 | Shaashua | |
| 2015/0058226 A1 | 2/2015 | Gupta | |
| 2015/0067541 A1 | 3/2015 | Owens | |
| 2015/0172997 A1 | 6/2015 | Griot | |
| 2015/0279366 A1* | 10/2015 | Krestnikov | H04W 4/70 704/235 |
| 2016/0021039 A1* | 1/2016 | Woo | H04L 51/046 715/752 |
| 2016/0195856 A1* | 7/2016 | Spero | G06N 5/046 700/90 |
| 2016/0225372 A1* | 8/2016 | Cheung | G10L 15/22 |

FOREIGN PATENT DOCUMENTS

| | | |
|---|---|---|
| WO | WO 2014/172567 A1 | 10/2014 |
| WO | WO 2015/006045 A1 | 1/2015 |
| WO | WO 2015/050892 A1 | 4/2015 |
| WO | WO 2015/092484 A1 | 6/2015 |

OTHER PUBLICATIONS

Communication, European Search Report, Annex to the European Search Report, European Patent Office, Patent Application No. EP 16 18 3058, dated Nov. 21, 2016.
Communication, European Search Report, Annex to the European Search Report, European Patent Office, Patent Application No. EP 16 18 3068, dated Nov. 21, 2016.
Communication, European Search Report, Annex to the European Search Report, European Patent Office, Patent Application No. EP 16 18 3066, dated Nov. 21, 2016.
Communication, European Search Report, Annex to the European Search Report, European Patent Office, Patent Application No. EP 16 18 3067, dated Nov. 21, 2016.
Jong-Ho Choi, Dong-Oh Kang, Joon Young Jung, and Changseok Bae, "Estimating Social Tie Strength for Autonomous D2D Collaborations," International Journal of Future Computer and Communication, vol. 4, No. 1, Feb. 2015.
International Search Report and Written Opinion for International Application PCT/US2016/045684, dated Nov. 8, 2016.
International Search Report and Written Opinion for International Application PCT/US2016/045680, dated Nov. 9, 2016.
International Search Report and Written Opinion for International Application PCT/US2016/045689, dated Nov. 10, 2016.
International Search Report and Written Opinion for International Application PCT/US2016/045683, dated Nov. 10, 2016.
International Search Report and Written Opinion for International Application PCT/US2016/045679, dated Nov. 15, 2016.

* cited by examiner

CONTROLLING A DEVICE CLOUD

PRIORITY

This application claims the benefit, under 35 U.S.C. § 119(e), of U.S. Provisional Patent Application No. 62/201,496, filed 5 Aug. 2015, which is incorporated herein by reference.

TECHNICAL FIELD

This disclosure generally relates to a managing connected devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH (BT) communication, near-field communication (NFC), or infrared (IR) communication or communication with wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments allow for a user communicate via messenger to control, manage, or activate a user's smart devices. In further embodiments, a human-like-intelligence may be implemented within messenger such that a user is able to use natural language while controlling, managing, or activating a user's smart devices. In particular embodiments, upon a user asking that a particular light be turned on, messenger may not need to be told which precise light needs to be turned on, but may be able to infer which light to turn on based on surrounding factors. For example, upon messenger notifying a user that the kitchen light has been turned on due to activity, the user may simply respond "Turn off the light" without indicating it is the kitchen light the user wished to turn off. The messenger may know to turn off the kitchen light in response to receiving the user's message.

In particular embodiments, a user may have the ability to query, program, and manage connected devices through input of a messaging application. As an example and not by way of limitation, the messaging infrastructure may have the ability to understand a natural-language command message within the context of connected devices. In particular embodiments, a backend system may parse text of the natural-language command message. The backend system may determine a context from previous device interactions.

In particular embodiments, a user may gain temporary access to connected devices through a messaging application. As an example and not by way of limitation, the user may grant access to a connected device by sending a natural-language message identifying the other user and the connected device. In particular embodiments, a backend system may determine an affinity score between the two users satisfies a pre-determined threshold, in which case the other user may be allowed temporary access to the connected device.

The embodiments disclosed below are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
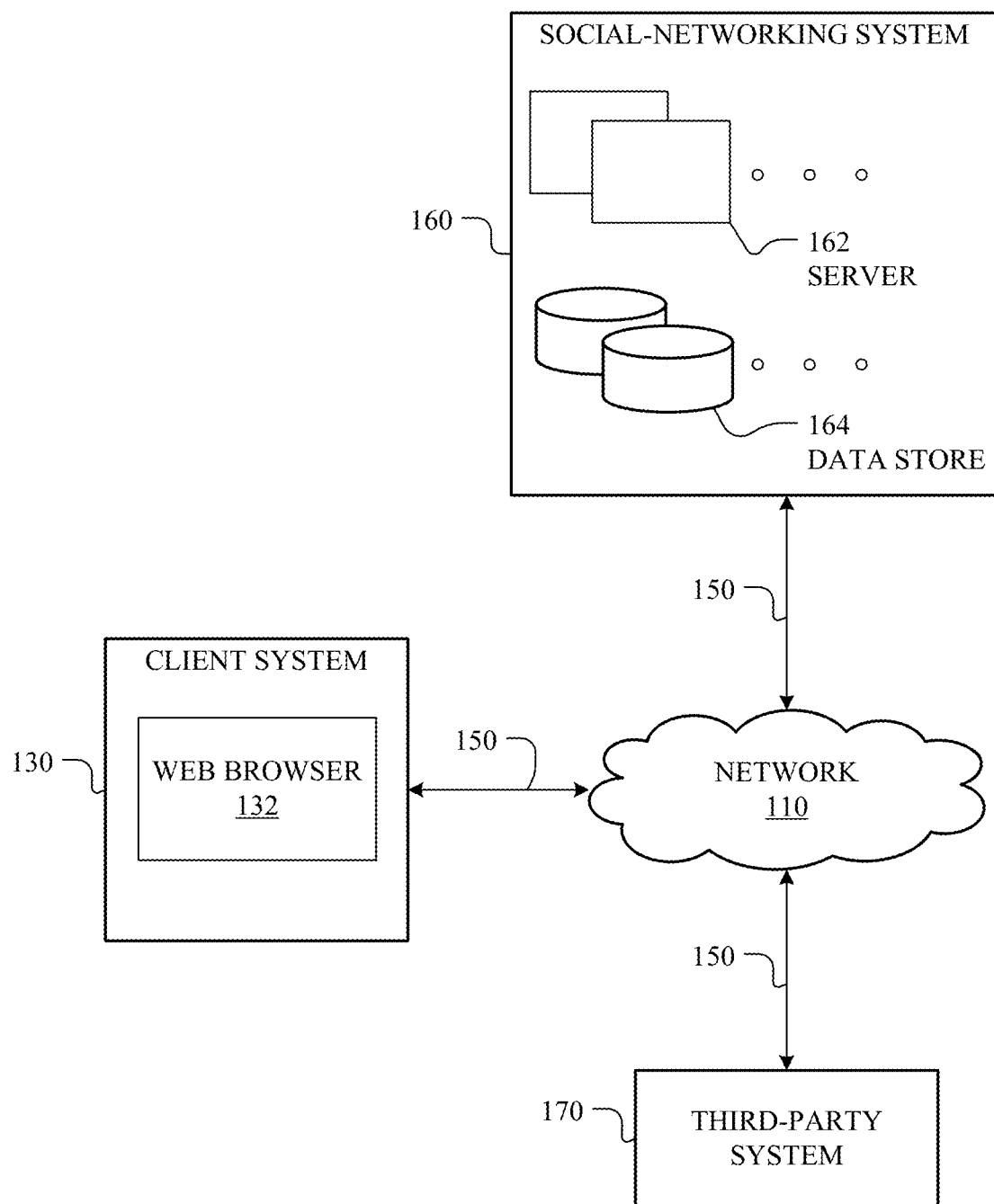
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
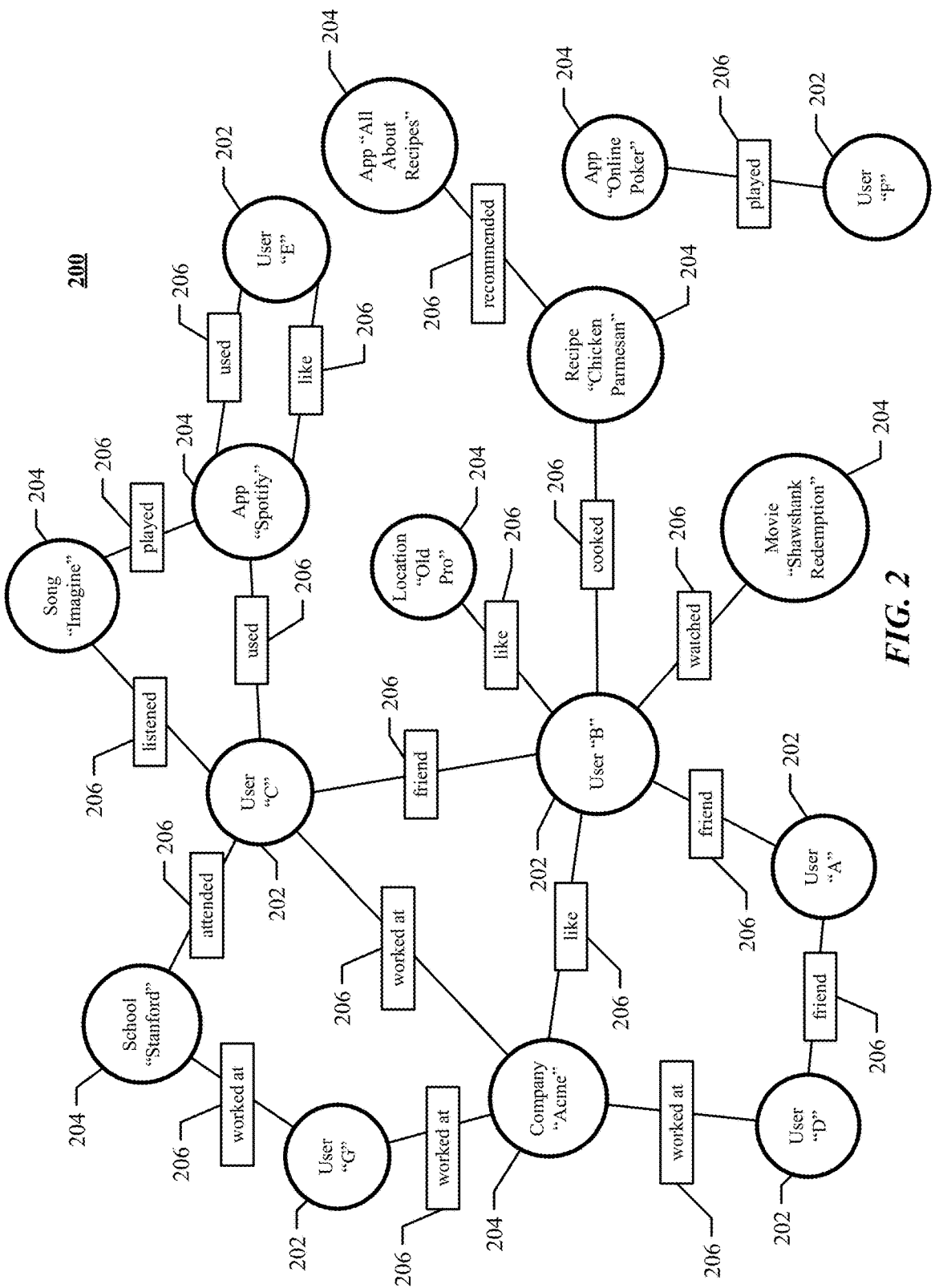
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express him or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (e.g., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object may have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, a system, described below, may provide benefits to the consumer/supplier/retailer/etc. In particular embodiments, the system may provide photos and/or videos for home monitoring and communicating with family—potentially using local (and not necessarily cloud) storage, and may access photos and videos stored in an online system, if connected. In further embodiments, the system may provide a social Wi-Fi communication network, in which the system may authorize a user's friends to join a particular WiFi communication network with no login necessary. In further embodiments, the system may provide robust privacy controls, in which the system may enable people to share data (to a social networking system/partner/ third party applications) in contexts in which they may understand, may see the benefits of sharing the data, and may provide consent. In further embodiments, the system may provide information as to who is at home and when a particular person left; this may be extended to friends nearby. In further embodiments, the system may provide virtual security whereby the system may provide constant updates to a gateway for protection against virus, malware, phishing, etc. In further embodiments, the system may use notifications to update based on any type of home event and also the ability to remotely trigger a siren and/or contact emergency services (e.g., by dialing 911).

Instead of requiring the attention and effort of a user at home, the system, described below, is able to provide location awareness, identify multiple individuals, and incorporate machine-learning support that enables a user to have their house configure and adapt itself, as well as responding to user commands. For example, the system may provide a more seamless experience to use, configure, and automated functionality for security-related devices, such as cameras, door sensors, door locks and motion sensors.

In particular embodiments, the system may create an open platform for connecting a home into a seamless wireless experience. In particular embodiments, the system may provide a solution that harnesses a social network's key assets (e.g., identity, social graph, security, or expertise driving open and affordable reference designs) to improve the home and the family's experience interacting with its home. In particular embodiments, the system may enable an open platform to support and provide value to Internet of Things (IoT) device providers.

Figure 3:
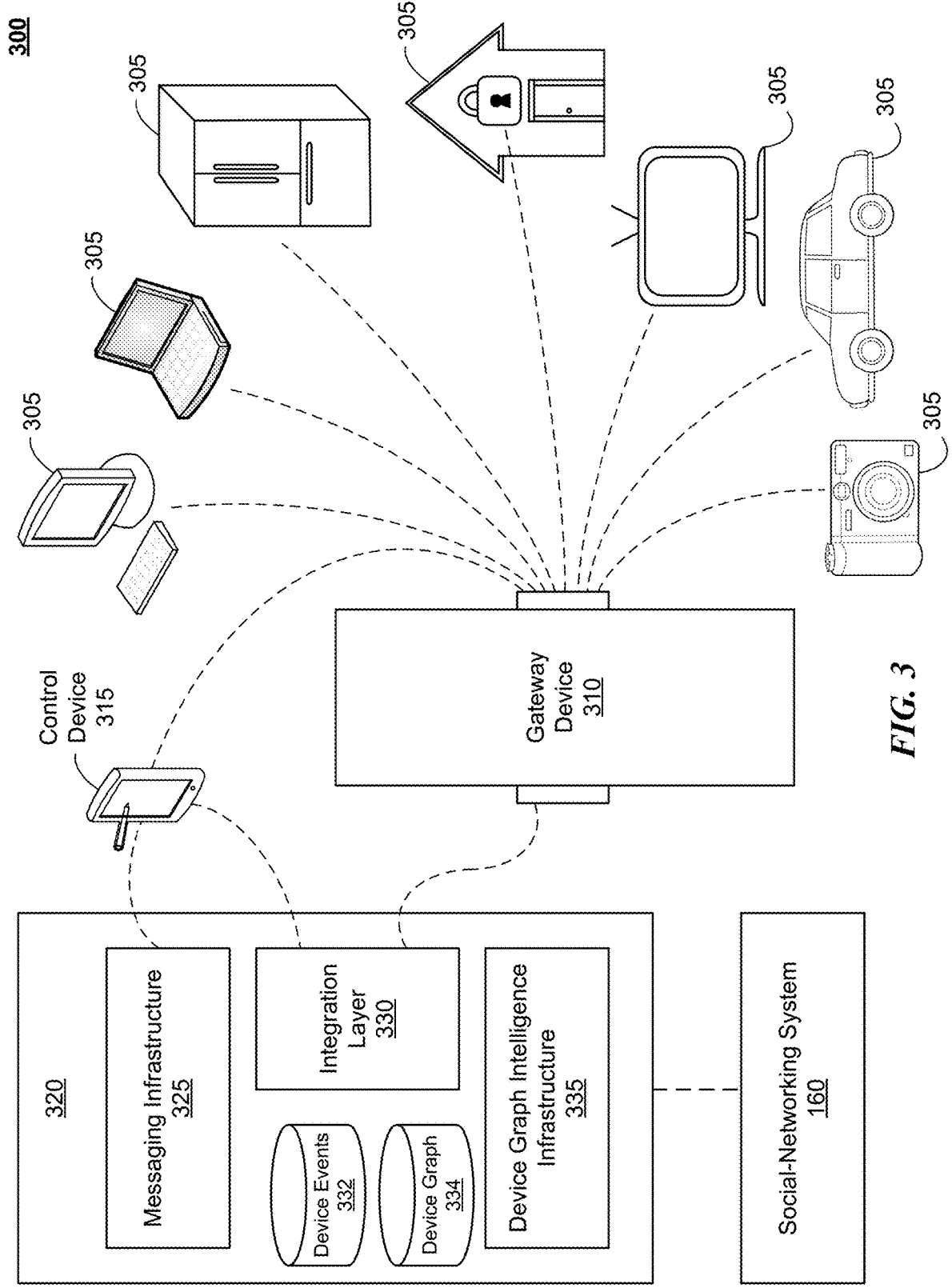
FIG. 3 illustrates an example architecture for managing a device cloud.

FIG. 3 illustrates an example architecture for managing a device cloud that includes a set of devices. One or more connected devices 305 in the device cloud may be used to communicate with and control (actively or automatically) one or more other connected devices 305 in the device cloud. As described below, control interface or application may be provided on control device 315 to control other devices 305 in the device cloud. In particular embodiments, system 300 may include a gateway (GW) device 310 in communication with a number of connected or "smart" devices 305 and a control device 315. In particular embodiments, gateway device 310 may reside in a particular physical location. Connected devices 305 may include anything from complex embedded computing devices to switches to simple sensors—for example, connected devices 305 illustrated in the example of FIG. 3 include a desktop computer, a laptop, a refrigerator, a home security system, a television, a vehicle, and a single-lens reflex (SLR) camera.

Control device 315 may present a user interface (UI) (e.g., by way of an installed control application, a browser, a short-messaging service (SMS) texting interface, or an interface provided by control device's 315 operating system for interacting with gateway device 310 and with connected devices 305 (by way of gateway device 310). As an example and not by way of limitation, a user's smartphone or tablet 315 may display a user interface for accessing or controlling connected devices 305 of the device cloud, such as for example, connected lights, a heating/cooling system, door-lock mechanism, or security system. In particular embodiments, control device 315 may provide controls for particular "controllable" devices in the device cloud, e.g., those that are sensed within a threshold proximity, those that include a remote-interaction interface by which the device can receive and process commands for remote control, those for which the user has been granted authorization to control the device, or those that are available (e.g., powered on, connected to a network, operational, and/or enabled for remote control). In particular embodiments, the control application of control device 315 may interface with a gateway application of gateway device 310 to provide the functionality to control and interact with connected devices 305 of the device cloud. In particular embodiments, control device 315 may include one or more UI clients (e.g., a messaging service or control application), which acts as the main user experience (UX) point with system 300; social networking application or other mobile application—a helper application, used for initial provisioning, BLUETOOTH and location discovery, and generally anything permission-related that the messaging application cannot do. Herein, reference to provisioning may refer to a set-up process of preparing or configuring a device 305 for use on a particular system (e.g., gateway-based system 300).

System 300 may provide superior in home connectivity for all IoT devices (e.g., platform as a product). Herein, reference to a control application may refer to a browser-based application or another application installed on control device 315. In particular embodiments, the control application may be used by the user to provision connected devices 305. In further embodiments, the control application may provide a specific UX for the user based on particular scenarios. In particular embodiments, the control application on control device 315 may enable viewing a list of connected devices 305 of system 300, setup of rules regarding controlling connected devices 305, or push status updates from connected devices 305 to an application on the control device 315 (e.g., control application).

In particular embodiments, connected devices 305 may be provisioned using BLUETOOTH, NFC, or any other appropriate form of communications between the connected device 305 and gateway device 310. In particular embodiments, system 300 may provide a number of management features of connected devices 305. As an example and not by way of limitation, a social graph or device graph, described herein, may be leveraged to connect with people within the house or anywhere globally (e.g., voice over internet protocol (VOIP), video calling)—also enable incoming photo caller ID pulling from the social graph (e.g., a social networking application may be synchronized to the contacts on phones). In particular embodiments, system 300 may leverage social-networking system 160, a social graph associated with social-networking system 160, a device graph associated with social-networking system 160, particular identities in a social graph, notifications provided to users, and an "open platform" approach.

In particular embodiments, system 300 may enable control of connected devices 305, such as for example, thermostats, vents, light control, blinds control, selective power times (car charging, laundry, dishwasher), or home-monitoring systems. As an example and not by way of limitation, audio or video content may be unicast or multicast from any connected device 305 to any other connected device 305 connected through gateway device 310. In particular embodiments, natural language processing (NLP) technology, described below, may be leveraged to enable a user to verbally or textually control devices 305 of system 300. In particular embodiments, system 300 may track temperature, humidity, air quality, etc., of a home through sensors of connected devices 305 and send alerts if issues are discovered. In particular embodiments, system 300 may retrieve an event "feed" from connected devices 305 for use in suggesting rules based on past behavior and personalize the smart-home experience with regard to connected devices 305.

In particular embodiments, system 300 may display or "surface" the most relevant social-networking system 160 or third-party 170 information or stories, based on time of day, for each surface (e.g., connected device 305) within the house with a display (weather, birthdays, relevant news/public content, offers/deals, ads, etc.). As an example and not by way of limitation, any shared content may be surfaced on a display of connected devices 305 in the house via a social-networking application, a social media photo sharing application, a messaging application, etc. In particular embodiments the system 300 may provide an automated shopping experience, in which the system may track purchasing and consumption habits to assist in automating recurring purchases of consumables. In particular embodiments, the system 300 may provide insight to a user's purchasing decisions. Awareness of home activities and of its dwellers may provide detailed insight as to how exactly someone goes about making a purchase decision. Factors such as, for example, physical location in home, devices 305 used, number of family members viewing item, conversations, time between viewing, etc. may be sensed and used in gaining a deeper understanding to the steps users go through in making purchase decisions and closing the loop on digital ads to physical purchasing (critical to measuring ad spend ROI).

In particular embodiments, the system 300 may provide a method for optimizing ads and content based on the activity of what is happening within the system 300. For example, understanding the current environment in the home can help in both providing more appropriate consumption content to family members (whether through social-networking system 160, or media content in the home), or determine the most appropriate timing to show ads. From simple things like advertising for things that are missing or broken in the home, to showing the cool car advertisement not when parents are running around and only checking notifications between feeding the kids and putting to bed, but rather when they are leisurely scrolling news feed while the TV is playing a show that only one of them watches passionately.

In particular embodiments, system 300 may expand the capabilities of a gateway device 310 to serve as a central home computer and IoT hub. In further embodiments, the system 300 may provide local storage and support for all critical wired and wireless protocols for broadband access to the outside world and communication between connected devices 305 within the home at exceptional quality. In further embodiments, the system may develop analytic tools for connected third party devices and broadband devices. In further embodiments, the system 300 may establish open principles, run on standard protocols, generic hardware (HW), open-source operating systems, open-source APIs, etc. In further embodiments, the system 300 may contribute potential improvements in hardware and firmware wireless technology to communities of hardware builders.

Such a system architecture may be used for connected devices 305 present within a defined physical space (e.g., a house, an office building, or a park) or with a set of connected devices 305 related to a particular user or entity (e.g., those associated with a user with connected devices in their home, their car, and their small retail business; or belonging to a property management business managing door locks and alarm security systems for a group of buildings)—in this latter scenario, each of the physical locations (e.g., house, car, and business) may each need their own gateway device 310.

Gateway device 310 may interface with a backend system 320, which may be hosted on a remote server or group of servers. Backend system 320 may include a messaging infrastructure 325 (e.g., to communicate with control device 315) and an integration layer 330 (e.g., a platform and/or application-programming interface (API) to interface with a diverse array of connected devices 305, such as PARSE) to interface between elements of backend system 320 and gateway device 310 (and/or control device 315 and/or directly with connected devices 305). Backend system 320 may maintain a data store 332 of device events, including data received from gateway device 310 and each of the connected devices 305, as well as data derived therefrom. Backend system 320 may also maintain a data store 334 for one or more device graphs, described below, in which gateway device 310 and each of the connected devices 305 may each be represented by a device node with device edges connecting the device nodes. Backend system 320 may include a device-graph-intelligence infrastructure 335 for processing and analyzing the device events, updating the device graph, and providing feedback and/or instructions to connected devices 305 and/or control device 315. Backend system 320 may also communicate with social-networking system 160. In particular embodiments, certain functionality may be provided by gateway device 310, by backend system 320, or by a combination thereof.

In particular embodiments, a gateway device 310 may refer to any computing device capable of supporting the required functionality to facilitate local network control of smart/connected device(s) 305 and act as a local gateway for a service that may run in the cloud. Herein, reference to a service may refer to a particular software functionality or a set of particular software functionalities (e.g., the execution of particular operations). In particular embodiments, the service may facilitate communication with the user. In particular embodiments, the system 300 and the user may communicate using natural language (which may then be parsed, as described below). In particular embodiments, a user may use a messaging application to communicate with a gateway device 310 and/or with any of the connected devices 305 (by way of the gateway device 310).

In particular embodiments, gateway device 310 may include any computing device comprising a processor, close-range networking capability, and the capacity to perform some or all of the functionality described herein. As an example and not by way of limitation, gateway device 310 may be based on a standard computing device or server and a USB power cable; MICRO secure digital (SD) card and a MICRO SD card to standard SD card adapter; WiFi dongle; BLUETOOTH dongle; HDMI cable and monitor; or ZWAVE dongle. In particular embodiments, a HDMI cable may be inserted into gateway device 310 to view the output of particular steps, however viewing the output is not required. In particular embodiments, the HDMI cable/monitor may be substituted for a USB-Serial cable that may be plugged into the gateway device 310. In particular embodiments, there may be no need for dedicated hubs for different home control devices. In particular embodiments, provisioning of gateway device 310 may be performed using BLUETOOTH low energy (BTLE).

In particular embodiments, gateway device 310 may include a gateway application that runs on a local gateway device 310 connected to the user's home network. In particular embodiments, gateway device 310 (e.g., based on a RASPBERRY PI platform running RASPIAN Linux and supporting WiFi, BLUETOOTH, ZWAVE and ZIGBEE dongles) may be used to host the gateway application, described above. In particular embodiments, the gateway application may be supported by a limited number of devices, in particular, but not limited to: support discovery and provisioning of two or more connected lights from multiple vendors (e.g., PHILLIPS HUE, BELKIN WEMO WiFi switch, ZIGBEE or ZWAVE smart switch); control of one or more pre-provisioned smart locks (e.g., LOCKITRON, AUGUST); control and streaming of content (e.g., music and/or video) to multiple devices 305 (e.g., WiFi-connected speakers, smart TVs, or the gateway device 310 itself (e.g., through a high-definition multimedia interface (HDMI) port)).

The gateway application's responsibilities may consist of understanding and dealing with the various smart/connected devices 305 at the "physical" level, including, but not limited to: discovery and provisioning of new connected devices 305 over BLUETOOTH, ZIBGEE, ZWAVE, WI-FI (access point and direct); mapping of physical devices to device type and device ID; mapping of device type to available capabilities; grouping/association of devices 305 having the same capabilities or type in a "vertical" (e.g., "lights" or "door locks"); support for understanding various industry protocols (e.g., ALLJOYN, THREAD, WEAVE, or ZIGBEE); translating particular user intents (e.g., associated with specific device IDs) passed from backend system 320 into command messages (e.g., "device ID(s) XXX on" may be translated by gateway device 310 to "Phillips Hue device ID XXX turn on"); and translating particular device notifications into logical notifications that may be interpreted by backend system 320 (e.g., "August SmartLock device ID XXX unlocked" may be translated by gateway device 310 to "device ID XXX unlocked"). In particular embodiments, while the gateway device 310 does some mapping between physical and logical devices, gateway device 310 may convert the messages into machine-readable structured formats. In particular embodiments, a user may explicitly group particular devices 305 or particular devices 305 may be implicitly grouped based one or more criteria (e.g., capability, location, previous interactions, or device-graph connections or device edges between nodes representing devices 305 and node representing users).

In particular embodiments, once the user is logged in, the gateway application may run periodic BT scans to detect connected devices 305. In further embodiments, for unknown, nearby connected devices 305, system 300 may: test the echo characteristics to check if connected device 305 is password protected; show notifications to the user about connected device 305; if the user clicks on the notification, ask if the user wants to add connected device 305 to system 300; if connected device 305 is password protected, ask the user for the password; if not password protected, add connected device 305 to system 300.

In particular embodiments, for known, nearby connected devices 305, system 300 may: if device 305 is connected to system 300, cache the status of connected device 305; test the cached password with echo characteristics; if the password has been changed, show a notification to the user; if connected device 305 is not connected to system 300, show a notification to the user; if the user clicks on either notifications, ask for password of WiFi credentials. In particular embodiments, all of these functions be performed through a device details screen of the gateway application. In further embodiments, the device details screen may offer ability to rename connected device 305, set/change the password of connected device 305, explicitly disconnect/update WiFi of connected device 305, or execute any commands supported by connected device 305.

In particular embodiments, backend system 320 may include an application/service running in the cloud that is in communication with gateway device 310. Furthermore, backend system 320 may handle integration with messaging applications and NLP systems, translation of the user's intent to specific logical device control intent (e.g., using NLP and execution-context awareness) and machine learning (ML) to infer complex behavior rules involving multiple connected devices 305. In particular embodiments, backend system 320 may only interface with individual ones of connected devices 305 by way of gateway device 310. In particular embodiments, backend system 320 may deal with logical devices (e.g., "lights" vs "PHILLIPS HUE"), aliases assigned by a user (e.g., "front porch light"), and device groups (e.g., "all lights"). In particular embodiments, backend system 320 may map user aliases of devices 305 with logical IDs for the respective devices 305 provided by gateway device 310. As an example and not by way of limitation, a user name "front porch light" may be associated with a particular device ID, described above). As another example, an alias for a grouping/association of devices 305 along a "horizontal" or location (e.g., "living room" or "front door) may be mapped to the respective device IDs.

In particular embodiments, backend system 320 may map device capabilities of respective devices 305 to human or natural language input/output commands. As an example and not by way of limitation, specific intents from the user may be translated into a device ID based actions (e.g., "Turn on Front Porch Light" may be translated by backend system 320 to "device ID(s) XXX on"). Conversely, device notifications may be translated to a human-readable or natural language format by backend system 320 (e.g., "device ID XXX unlocked" may be translated by backend system 320 to "Front Door Unlocked"). In particular embodiments, these natural language control and notifications of devices 305 may be performed through a messaging application executed on control device 315. Backend system 320 may create and execute multi-device instructions (e.g., "when front door is unlocked, turn the front porch lights on").

In particular embodiments, to be able to interpret commands in a context-aware fashion, backend system 320 may include logic to access the device graph, described below, to identify a user ID (corresponding to a user who wants to take action) and/or user location information (e.g., based on signals like cell tower IDs of mobile cellular networks, WiFi geolocation, visible service-set identifications (SSIDs), or strong localization via GPS coordinates). For example, a user might be associated with gateway devices 310 associated with multiple locations (e.g., primary family home, weekend condo, secondary home), in which case, user location information may determine particular devices 305 that a particular command should apply.

Location determination techniques may be most effective in determining the location of a client system (e.g. control device 315) in open spaces, but it is difficult to determine a location within a building, such as for example a mall or movie theater. In particular embodiments, the location of the client system may be determined through the use of BTLE beacons that are part of an indoor positioning system. As an example and not by way of limitation, the location services of the client system may determine the client system is within proximity to a particular building, but the location of the client system may be refined using BTLE beacons located within a store to determine if the client system is inside or outside the building.

BTLE beacons are configured set to send a "proximity signal" at pre-determined time intervals. BLE beacons send a universally unique identifier (UUID) and a major and minor code. The UUID is used to identify a common group of beacons (e.g., associated with a particular store) and the major and minor codes may be used to uniquely associate a beacon with a given location or area of a physical space, so that any suitably equipped device nearby (such as a mobile device) can detect it. An application executed on the client system may process the proximity signal from the BTLE beacon within the building and social-networking system 160 may determine the client system is inside a building based on the information encoded in the proximity signal. As an example and not by way of limitation, a home equipped with BTLE beacons may differentiate between control device 315 being currently located in the living room or the kitchen of the beacon-equipped house. Although this disclosure describes particular methods of indoor-location determination, this disclosure contemplates any suitable method of indoor-location determination, such as for example, interior WI-FI router tracking.

In particular embodiments, a hub process running on gateway device 310 may: (a) listen to pushes from integration layer 330; and (b) write the received push data (e.g., to standard output). In particular embodiments, the hub process may be written in C. In particular embodiments, a rules runtime interpreter may include a JAVASCRIPT application that reads locally-stored rules; spawns the hub process and monitors the output of the hub process to: (a) parse the pushed data received from integration layer 330 and (b) based on the parsed information, do one or more of: updating the rules; storing new rules locally; executing device control; executing queries; discovering devices 305; parsing the rules; waiting for triggers (time or sensor) indicated by the rules; executing events on the triggers; executing device control; running a local webserver which allows triggering of the rules via local networks.

In particular embodiments, adding a connected device 305 to system 300 (e.g., by manually triggering a pairing process or being notified about auto-detected connected devices 305) may involve: generating a unique cloud device ID for device 305, creating a cloud-object for connected device 305 identified by the device ID and associate the cloud-object on gateway device 310, adding the cloud device ID to gateway device 310 (the cloud will reference to device 305 using this ID), add the basic data or characteristics of device 305 to the cloud, associate device 305 with an entry in a table that contains prototypes for known connected devices 305, add metadata to connected device 305 from tags, where a tag has an associated type and value and resides within the context of gateway device 310.

In particular embodiments, the gateway application sits between connected devices 306 and backend system 320 through which the user interfaces with in order to control connected devices 305 of the device cloud. As such, the gateway application receives command messages sent from backend system 320 and converts the command messages to instructions to control connected devices 305.

In particular embodiments, instructions controlling connected devices 305 may be "pushed" from integration layer 330 of backend system 320 to connected devices 305. As an example and not by way of limitation, the instructions may include an application ID (e.g., device ID) associated with control device 315. In particular embodiments, the instructions may include a flag or variable for directing the instructions to a particular connected device 305, a grouping of connected devices 305, or all the connected devices 305 of the device cloud. As described above, a unique identifier is generated for each connected device 305 and may be stored in integration layer 330 in a data table. In particular embodiments, the instructions pushed to connected devices 305 may correspond to functions such as for example rule, discover, query, control, or update.

As an example and not by way of limitation, a rule function is a set of instructions to be performed by connected device 305 in accordance to a particular condition. Example conditions may include a device based condition or a time-based condition. These conditions may be executing the instructions when device 305 enters a certain state or at a set time or day of week, respectively. In particular embodiments, a device cloud (e.g., in a home) may have a corresponding instance in the cloud. Each device action (e.g., control instructions, device alert, etc.) may be logged and sent over a messaging queue of the device cloud instance. A rule may have a control instruction, which may be executed by connected device 305 based on timing or triggered by another condition. A particular device cloud instance may have a rule execution engine for digesting device action messaging queue and execute rules. In particular embodiments, a rule may be implemented as a series of commands.

In particular embodiments, a discover instruction returns a list of connected devices 305 that are currently connected to gateway device 310. In particular embodiments, a query instruction returns the current status of one or more connected devices 305. As an example and not by way of limitation, a query instruction may include a device identifier of connected device 305 and a type associated with connected device 305. In particular embodiments, a control instruction causes gateway device 310 to change the current state of a specified connected device 305 based on one or more configuration parameters or settings included with the control instruction. The configuration settings may be specific to the type of device 305 being controlled. As an example and not by way of limitation, configuration settings for a connected light-bulb may include power on, power off, brightness, or hue. As another example, configuration settings for a connected music player may include volume setting, power on, power off, or particular content or playlist to be played.

In particular embodiments, elements of system 300 may include an API to provide access profiles for applications interfacing with system 300, such as: gateway device 310: the central entity in the home interfacing all devices of that home and providing local access as well as the offline experience; backend system 320: controls the home with natural language from messaging application; a mobile app or browser-based management interface (either one running on control device 315) to manage the device cloud.

As described above, a user may communicate via the control application to control, manage, or activate one or more connected devices 305 of a user's device cloud. Control device 315 may interact with connected devices 305 through the gateway application of gateway device 310. In particular embodiments, the functionality of the control application may be incorporated in a messaging application, such that the messaging application may serve as both a messaging application with other users and the control application to interact with connected devices 305 of the device cloud. As an example and not by way of limitation, a messaging application provides real-time text transmission between two or more client systems over a communication network (e.g., WI-FI or cellular data network). In particular embodiments, text transmission between client systems may be performed using a particular "chat" (e.g., MQ telemetry transport (MQTT)) protocol or SMS protocol). Furthermore, messaging applications may also support file transfer, clickable hyperlinks, VOIP calls, or video chat functionality.

In particular embodiments, the user may have the ability to query, program, or manage connected devices 305 using the control application (e.g., messaging application). In particular embodiments, a human-like or artificial intelligence may be implemented within a messaging application such that a user is able to use natural-language command messages to control, manage, or activate a user's connected devices 305. In particular embodiments, the command message sent by the messaging application may be a voice-transcribed message. As an example and not by way of limitation, the user may speak "list my home devices" to a microphone of control device 315 and the messaging application may generate the command message using voice-transcription and send a corresponding command message to messaging infrastructure 325. Integration layer 330 may send instructions corresponding to the natural-language command message to gateway device 310. In particular embodiments, backend system 320 has the ability to build an execution context from previously used connected devices 305 and implicitly infer which connected devices 305 to interact with. As an example and not by way of limitation, an execution context for the instructions may correspond to a time, place, commands, frequency that commands have been performed, or a number of times commands should be performed. As another example, determining the execution context may include determining a level of authorization for the user; determining permissions or privacy settings configured for connected devices 305; determining an interaction history for the user; or determining a current location of the user.

In particular embodiments, the messaging application has the ability to understand human-natural language chat or messaging between users within the context of connected devices 305 through NLP. In particular embodiments, the command message may be sent to social-networking system 160 to parse the text of the command message and identify one or more n-grams. In general, a n-gram is a contiguous sequence of n items from a given sequence of text in the command message. As an example and not by way of limitation, the items may be characters, phonemes, syllables, letters, words, base pairs, prefixes, or other identifiable items from the sequence of text that makes up the command message. The n-gram may include one or more characters of text (letters, numbers, punctuation, etc.) entered through the UI of the messaging application. In particular embodiments, each n-gram may include a character string (e.g., one or more characters of text) of the command message. In particular embodiments, social-networking system 160 may return the identified n-grams to device-graph-intelligence infrastructure 335 of backend system 320 that may match the identified n-grams with nodes of the device graph stored in data store 334, as described below.

In particular embodiments, social-networking system 160 may return names, types, categories, or other identifiers that match the identified n-grams to backend system 320. The NLP process may use one or more matching algorithms to attempt to identify commands (e.g., control or query), device IDs, or location names that match identified n-grams. When a match or matches are found, the NLP may send the names (name strings) corresponding to particular connected devices 305 or groupings of connected devices 305 as well as, potentially, other metadata associated with the to device-graph-intelligence infrastructure 335.

In particular embodiments, social-networking system 160 may return the identified n-grams to backend system 320. In particular embodiments, device-graph-intelligence infrastructure 335 may match the identified n-grams to an alias for a particular connected device 305, a grouping/association of connected devices 305 along a horizontal (e.g., "living room" or "front door), or a grouping/association of connected devices 305 in a "vertical" (e.g., "lights" or "door locks"). In particular embodiments, device-graph-intelligence infrastructure 335 may match the identified n-grams to an alias for particular locations (e.g., living room or backyard).

In particular embodiments, device-graph-intelligence infrastructure 335 may match the identified n-grams to previous interactions with connected devices 305 stored in device events data store 332. As an example and not by way of limitation, upon a user instructing (through text or audio messaging on a messaging application) that a connected light be turned on, backend system 320 may not need to be explicitly directed to a particular connected light, but may be able to infer which connected light to turn on. In particular embodiments, this inference may be based on previous interactions with connected devices 305 stored on device-events data store 332 and the current location of the user. As an example and not by way of limitation, backend system 320 may determine, based previous interactions stored on device-events data store 332, that the user has on past occasions instructed the lights in the kitchen be turned on while in the kitchen. As another example, device-graph-intelligence infrastructure 335 may be able to infer based on messaging infrastructure 325 sending the user a notification regarding the kitchen light being turned on, that a subsequent command message from the user to turn off a light refers to the kitchen light that was recently turned on.

In particular embodiments, based on the execution context, integration layer 330 may convert a command message received from messaging infrastructure 325 into an instruction that is sent to gateway device 310. As an example and not by way of limitation, a command message "turn on front porch light" may converted into an instruction "device ID(s) XXX on" based on the execution context of the current location of the user being near the front porch and the user previously turning on this same front porch light (from device events data store 332). As another example, a command message "set temperature to 75° F. at 6 pm" may be converted into an instruction of "device ID(s) XXX control temp=75 time=18:00" based on the execution context of the user previously turning on the thermostat (e.g., from device events data store 332).

As described above, integration layer 330 may also receive a device message from connected devices 305 and convert the device message to a natural-language message to be sent to control device 315 through messaging infrastructure 325. As an example and not by way of limitation, the device messages may include status updates in response to user queries, a request for additional information to clarify a command message; a request to authenticate the user; a message acknowledging the command message or confirming completion of the instructions, a message stating that the instructions cannot be executed, or an alert regarding one or more of connected devices 305.

Figure 4:
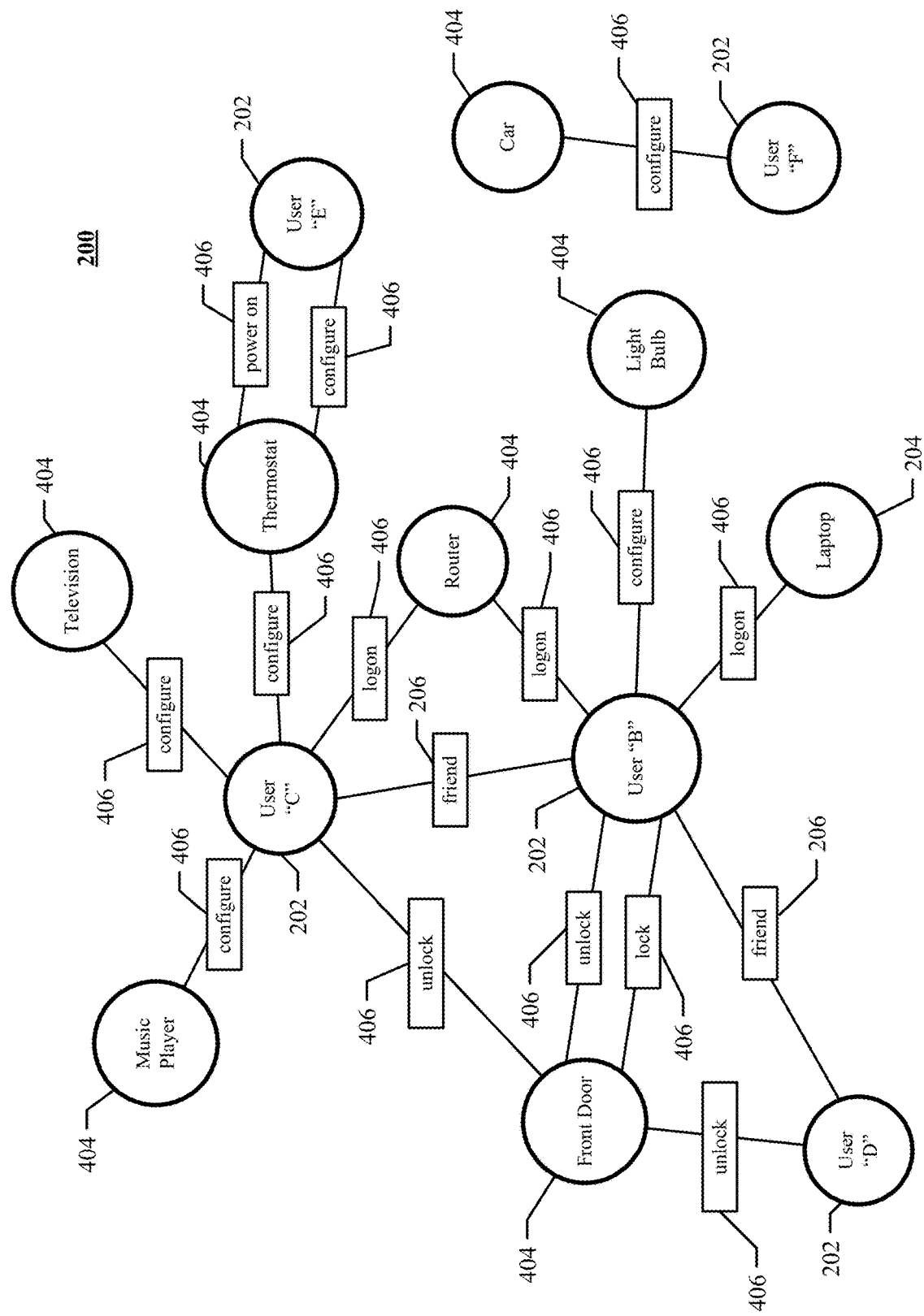
FIG. 4 illustrates an example device graph.

FIG. 4 illustrates an example device graph 400. In particular embodiments, backend system 320 may store one or more device graphs 400 in device graph data store 324. In particular embodiments, device graph 400 may be integrated with social graph 200 of social-networking system 160. Device graph 400 may be analogous to social graph 200 and may include multiple user nodes 202 (each corresponding to a particular user) or multiple device nodes 404 (each corresponding to a particular device)—and multiple edges (e.g., 206 or includes a "device" edge 406). As an example and not by way of limitation, each connected device 305 located in a user's home may be represented by a node 404 in device graph 400. In particular embodiments, device edges 406 connect nodes corresponding a particular connected device 305 to a node 202 corresponding to a user, based on the user sending a command to or interacting with the particular connected device 305. In particular embodiments, device graph 400 may include edges 206 between pairs of user nodes 202 representing a relationship between users, as described with regard to FIG. 2.

In particular embodiments, a device node 404 may correspond to a connected or smart device 305. As described above, a connected or smart device 305 may correspond to a desktop computer, a laptop, a head-mounted display (HMD), connected thermostat, refrigerator, home-security system, connected light-switch, connected light-bulb, connected-door lock, media server, television, vehicle, network router, web-enabled camera, single-lens reflex (SLR) camera; another suitable device; or two or more such devices. A device node 404 may be associated with information of a concept provided by a user or information gathered by various systems, including social-networking system 160. As an example and not by way of limitation, information of a connected device 305 may include a name or a device ID; device type; device capabilities; a location (e.g., an address or a geographical location); owning user or entity; device alias assigned by the owner; other suitable device information; or any suitable combination of such information. In particular embodiments, a device node 404 may be associated with one or more data objects corresponding to information associated with device node 404.

In particular embodiments, one or more of the "device" edges 406 correspond to an action or setting associated with devices 305 represented by device nodes 404. In particular embodiments, a device edge 406 between a user node 202 and a device node 404 may represent a particular action or activity performed by a user associated with user node 202 toward a device 305 associated with a device node 404. As an example and not by way of limitation, as illustrated in FIG. 4, a user may "lock," "unlock," "configure," "logon," or ""power on," a device 305, each of which may correspond to a device edge type or subtype. As another example, a user (user "F") may configure to a particular device ("Car") using a particular messaging application. In this case, social-networking system 160 may create a "configure" edge 406 (as illustrated in FIG. 4) between user node 202 corresponding to the user and device node 404 corresponding to the car. Although this disclosure describes particular device edges 406 with particular attributes connecting user nodes 202 and device nodes 404, this disclosure contemplates any suitable edges 206 with any suitable attributes connecting user nodes 202 and concept nodes 204. Moreover, although this disclosure describes device edges between a user node 202 and a device node 404 representing a single type of relationship or interaction, this disclosure contemplates device edges between a user node 202 and a device node 404 representing one or more types of relationships or interaction. As an example and not by way of limitation, device edge 406 may represent both that a user has "locked" and "unlocked" a particular connected door lock. Alternatively, another device edge 406 may represent each type of relationship (or multiples of a single relationship) between a user node 202 and a particular device node 404 (as illustrated in FIG. 4 between user node 202 for user "B" and device node 404 for "Front Door"). In particular embodiments, social-networking system 160 may modify or update device graph 400 to create a new device edge 406 connecting nodes 404 corresponding particular devices to a node corresponding to a new user based on the new user interacting or sending a command to the particular connected device 305 for the first time. In particular embodiments, a new device node 404 and device edge 406 may be created and connected to a particular user node 202 when the particular user connects a new device 305 to gateway device 310 for the first time, as described above. As an example and not by way of limitation, device graph 400 may include device edges 406 connecting node representing other users (e.g., non-owner) to the user's device or between the user's device (e.g., desktop computer) and other connected devices (e.g., smart thermostat).

In particular embodiments, the various object types associated with system 300 may be represented by a device node 404 or as attributes of a device node 404 in device graph 400. As an example and not by way of limitation, device nodes 404 (or attribute of device nodes 404) may be associated with a connected device 305, a group of connected devices 305, gateway device 310, a zone (e.g., horizontal), or a set of device capabilities. In particular embodiments, different device associations may be represented as device edges 406 in device graph 400. As an example and not by way of limitation, device edges 406 may represent the association of connected devices 305 to gateway device 310, a user with gateway device 310, a user with connected devices 305, where permissions regarding respective connected device 305 may be an attribute associated with the respective device edge 406, connected devices 305 to a group of connected devices (e.g., vertical), or connected devices 305 to a device capability set.

In particular embodiments, NLP, described above, may perform or cause to be performed a search to identify existing device-graph elements having respective names, types, categories, or other identifiers matching the identified n-grams. Furthermore, device-graph intelligence infrastructure 335 may use one or more matching algorithms to attempt to identify user nodes 202, device nodes 404, or device edges 406 that match the n-grams of the parsed command message sent by the messaging application. When a match or matches are found, device-graph intelligence infrastructure 335 may retrieve information that includes, for example, the names (name strings) of the matching nodes (e.g., user 202 or device 404) as well as, potentially, other metadata associated with the matching nodes.

In particular embodiments, social-networking system 160 or backend system 320 may measure or quantify "device" affinity using a device affinity coefficient (which may be referred to herein as "device coefficient") that is analogous to the social-graph affinity described above. The device coefficient may represent or quantify the strength of a relationship between particular objects associated with connected devices 305 and the users of connected devices 305. In particular embodiments, a variety of factors may be used to calculate a device coefficient. These factors may include, for example, user actions, types of relationships between objects, location information, other suitable factors, or any combination thereof. In particular embodiments, different factors may be weighted differently when calculating the device coefficient. The weights for each factor may be static or the weights may change according to, for example, the user, the type of relationship, the type of action, the user's location, and so forth. In particular embodiments, a variety of variables may be considered when determining weights for various factors used to calculate a device coefficient, such as, for example, the time since a particular user interacted with a particular connected device 305, decay factors, frequency of interaction, relationship to information or relationship to the connected device 305 about which information was accessed, relationship to device-graph entities connected to the connected device 305, short- or long-term averages of user device interactions, other suitable variables, or any combination thereof. As described above, a device coefficient may include a decay factor that causes the strength of the signal provided by particular interactions to decay with time, such that more recent interactions are more relevant when calculating the coefficient. The ratings and weights may be continuously updated based on continued tracking of the interactions upon which the device coefficient is based. Any type of process or algorithm may be employed for assigning, combining, averaging, and so forth the ratings for each factor and the weights assigned to the factors. In particular embodiments, device coefficients may be determined using machine-learning algorithms trained on historical actions or past user interactions. Although this disclosure describes calculating device coefficients in a particular manner, this disclosure contemplates calculating device coefficients in any suitable manner.

In particular embodiments, a device coefficient may be calculated based on a user's interactions with one or more connected devices 305. As an example and not by way of limitation, if a user may make frequently interact with a particular "front door," the user may be determined to have a high device coefficient with respect to the particular "front door." Particular device interactions or types of interactions may be assigned a higher weight and/or rating than other device interactions, which may affect the overall calculated device coefficient. As an example and not by way of limitation, if a first user "configures" a "thermostat" (e.g., set the temperature), the weight or the rating for that particular interaction may be higher than if the first user simply "powers on" the "thermostat." In particular embodiments, the device coefficient may be based on the degree of separation between particular device-graph objects (e.g., device nodes). In particular embodiments, a device coefficient may be calculated based on the type of relationship between the particular users connected to a particular device.

Figure 5:
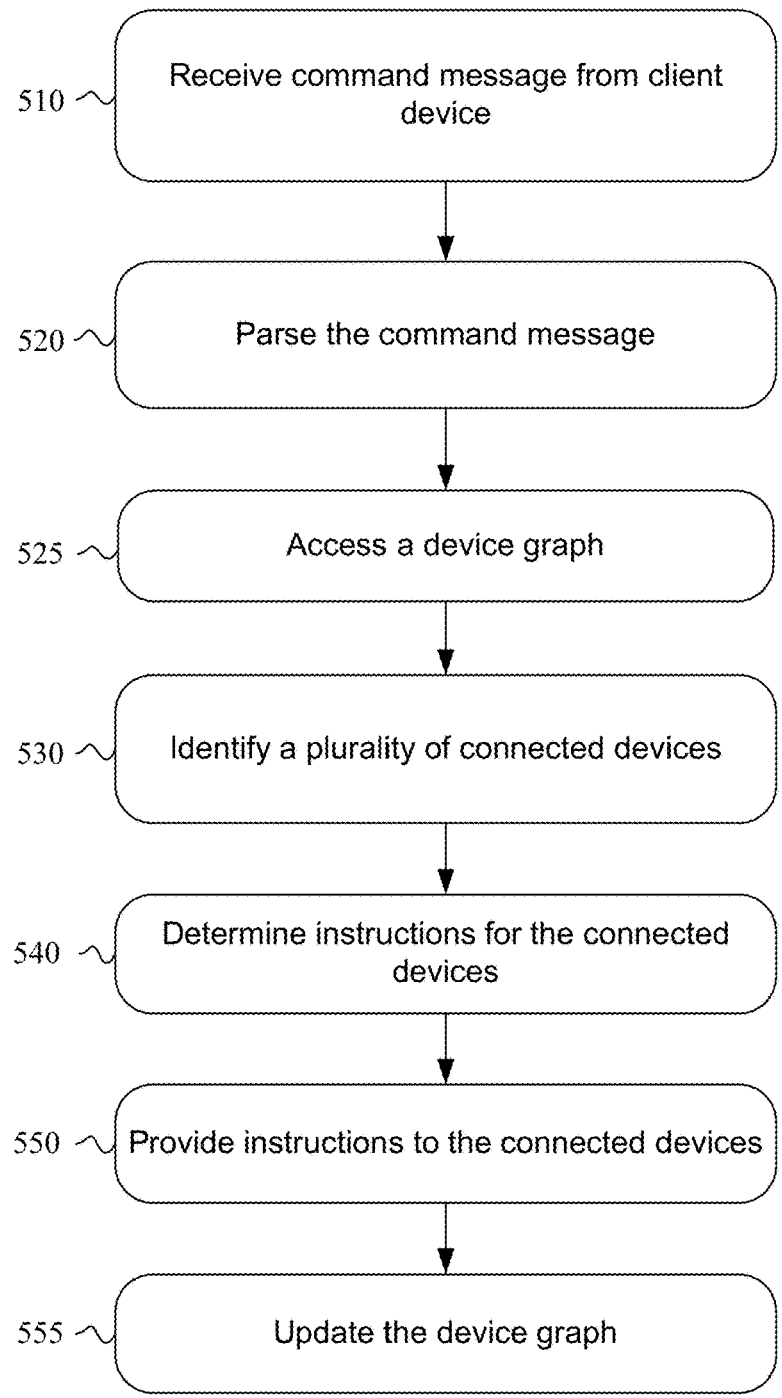
FIG. 5 illustrates an example method for controlling connected devices.

FIG. 5 illustrates an example method for controlling connected devices. The method 500 may start at step 510, where a computer server machine may receive a command message from a client device associated with a user. In particular embodiments, the command message is sent through a messaging application. At step 520, the computer server machine may parse the command message. In particular embodiments, the parsing identifies one or more n-grams of the command message. In particular embodiments, at step 520, the computer server machine accesses a device graph. In particular embodiments, the device graph includes at least one node representing the user, and one or more nodes that each represent a respective one of the connected devices. At step 530, the computer server machine identifies, based on the parsed command message, one or more of a plurality of connected devices. In particular embodiments, the computer server machine identifying the one or more of the plurality of connected devices based at least in part on one or more of the identified n-grams matching the one or more of the nodes representing the respective one of the connected devices. At step 540, the computer server machine determines, based on the parsed command message, one or more instructions for the identified connected devices. At step 550, the computer server machine provides the instructions to the identified connected devices. In particular embodiments, at step 555, the computer server machine updates the device graph. In particular embodiments, the computer server machine updates the device graph to add an edge connecting the node representing the user with the one or more nodes each representing the respective one of the identified connected devices.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for controlling connected devices, including the particular steps of the method of FIG. 5, this disclosure contemplates any suitable method for controlling connected devices, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In particular embodiments, the system 300 may provide for configuration of user-role settings (user, command, or location-based) in the device graph (e.g., permission models may allow for configuration of an administrator role for full control or a limited-user role with limited permissions). For example, a user may not want their children (who are playing in the living room where the stereo system is located) to change the music the user is currently being enjoyed while working in his home office.

Gateway device 310 may have one owner and other users may be authenticated to control one or more connected devices 305. In particular embodiments, a user (e.g., owner) may provide one or more other users (e.g., friend or family member) temporary access to connected devices 305 to through a command message sent using a messaging application, such that the messaging application acts as a group framework for authorization. As an example and not by way of limitation, access and authorization to one or more connected devices 305 may be provided to another user by adding the other user to a messaging chat session. As described above, natural-language command messages may be sent through a messaging application. As an example and not by way of limitation, a user may input a natural-language command message "give user 'B' key access to front door." In particular embodiments, backend system 320 may request that the user add user "B" to a group chat on the messaging app as part of the authorization process. In particular embodiments, backend system 320 may determine two users (e.g., the user and user "B") have a social-graph coefficient, described above, that satisfies a pre-defined threshold. In this case, a user (e.g., user "B") may be allowed temporary access to connected device 305 (e.g., front door). As an example and not by way of limitation, integration layer 330 may send a temporary door-open token to a client system of the other user (e.g., user "B") via that messaging application, such that when the friend is in the user's neighborhood, the friend may stop by the user's house and freely enter the front door.

In particular embodiments, the pre-defined threshold may be based on a device coefficient between the other user (e.g., user "B') and the particular connected device 305 (e.g., front door), described above, satisfying a pre-defined threshold. As an example and not by way of limitation, user "B" may be temporarily authorized to access the front door based on user "B" based on user "B" having a high device coefficient with the front door (e.g., frequent interaction with the front door). In particular embodiments, a level of authorization of the user for a particular connected device 305 may be based on affinity/social graph, group membership, profile data, or skill certification. In particular embodiments, the backend connection to the hub process may be the channel authorization for the use of the token (e.g., the sender of the token needs to have the permissions to share). In particular embodiments, a message may be sent to the user indicating the status of connected device 305 once the other user interacts with connected device 305.

As another example, system 300 may grant a time-limited access to a communication network (e.g., Wi-Fi) by creating temporary Wi-Fi networks and thereafter deleting the temporary Wi-Fi networks after a time limit has elapsed. As another example, a temporary Wi-Fi SSID may be broadcast through an out of band mechanism (e.g., through an event invitation or push notification sent through the messaging application), thereby allowing for automatic connections when particular users arrive within the vicinity of the Wi-Fi, or arrive to a particular location (e.g., if the SSID is hidden). In particular embodiments, the system may enable the transfer of personal information. In further embodiments, the system may include a user authentication token. In further embodiments, the identified account information may be fetched by the device once connected to the internet with the user token. In particular embodiments, a user may be authenticated by, but not limited to: a name, profile name, e-mail, phone number, or family circle. In further embodiments, information may be transferred by WiFi networks, BLUETOOTH MACs, or other associated IoT devices.

In particular embodiments, access or control of one or more connected devices 305 associated with may be provided on a temporary basis through a messaging application. As an example and not by way of limitation, users that were invited come to an area of the event, may receive a notification to join an event Wi-Fi network. If user accepts, the user may automatically transitioned over to the event Wi-Fi network. Connected devices 305 associated with the event, such as for example, a music server may have a playlist that is curated based on the overall tastes and preferences of the event attendees. A group chat may be automatically created on the messaging application, so users may make explicit requests for music/pictures. When an user posts a picture to the group chat, the picture gets forwarded to screen-based connected device 305 that is displayed at the event. In particular embodiments, for the use case above, flow from event to curated attendees may be implemented in group chat. Additionally, messaging application may provide a UI for notification and transfer to the new WiFi network, generating playlists on based on social-networking activity of the users (e.g., likes), streaming music (to be integrated with a music player), redirecting a group chat photo for display on a connected screen.

Figure 6:
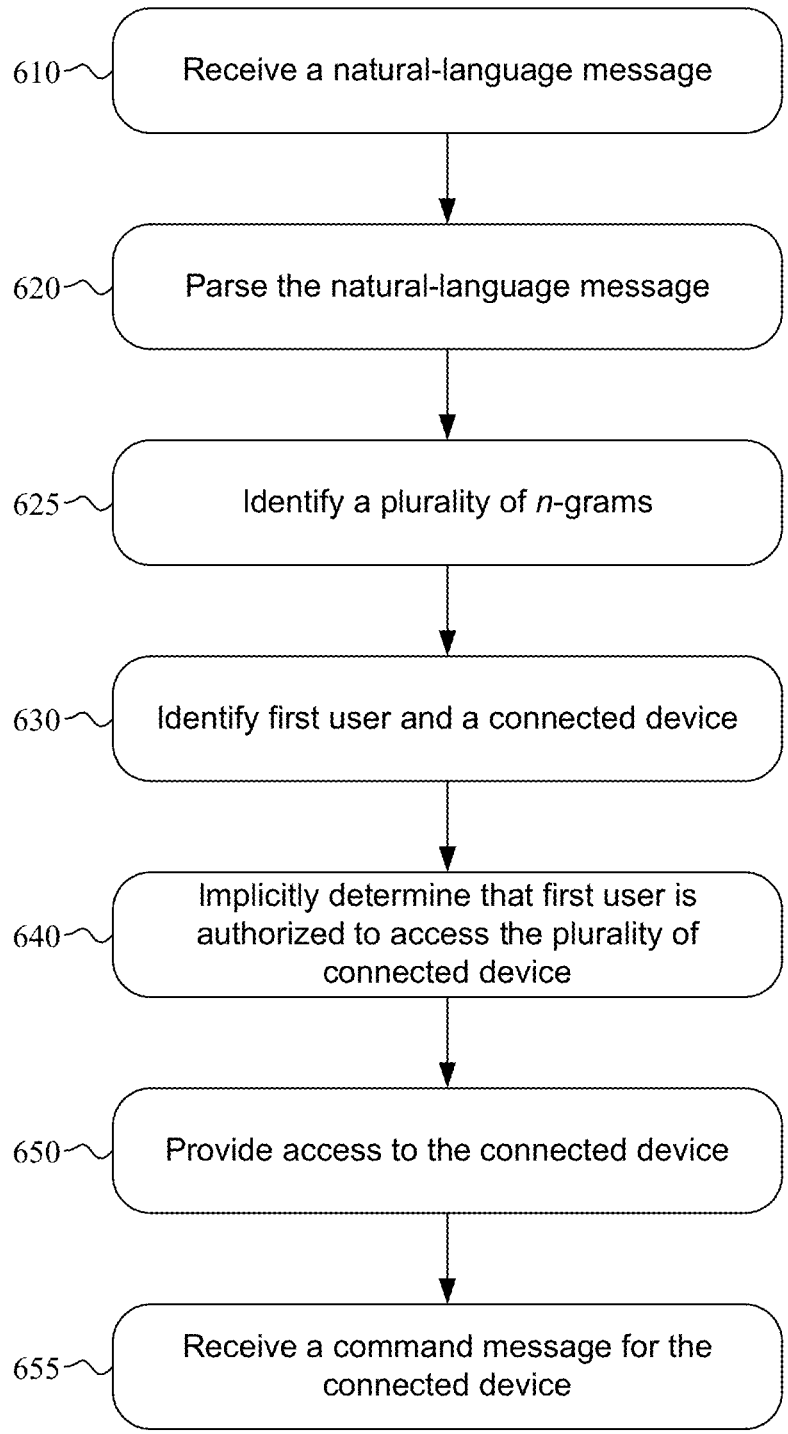
FIG. 6 illustrates an example method for providing access to connected devices.

FIG. 6 illustrates an example method for accessing connected devices. The method 600 may start at step 610, where a computer server machine may receiving a natural-language message. In particular embodiments, the natural-language message includes an authorization request to authorize a first user access to one or more of a number of connected devices associated with a second user. At step 620, the computer server machine parses the natural-language message. In particular embodiments, at step 625, the computer server machine may identify a number of n-grams of the parsed natural-language message. At step 630, the computer server machine identifies, based on the parsed natural-language message, the first user and one or more connected devices. In particular embodiments, identifying the connected devices includes identifying an identifier of the connected devices based on the n-grams. At step 640, the computer server machine, implicitly determines that the first user is authorized to access the identified connected devices. In particular embodiments, the authorization is implicitly determined based on a calculated strength of a relationship between a node representing the first user in a social graph and a node representing the second user in the social graph satisfying a pre-determined threshold. At step 650, the computer server machine provides, based on the implicit authorization, access to the identified connected devices. In particular embodiments, the access is provided for a pre-determined amount of time. In particular embodiments, at step 655, the computer server machine receives a command message for the identified connected devices from a client device associated with the first user. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for providing access to connected devices, including the particular steps of the method of FIG. 6, this disclosure contemplates any suitable method for providing access to connected devices, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
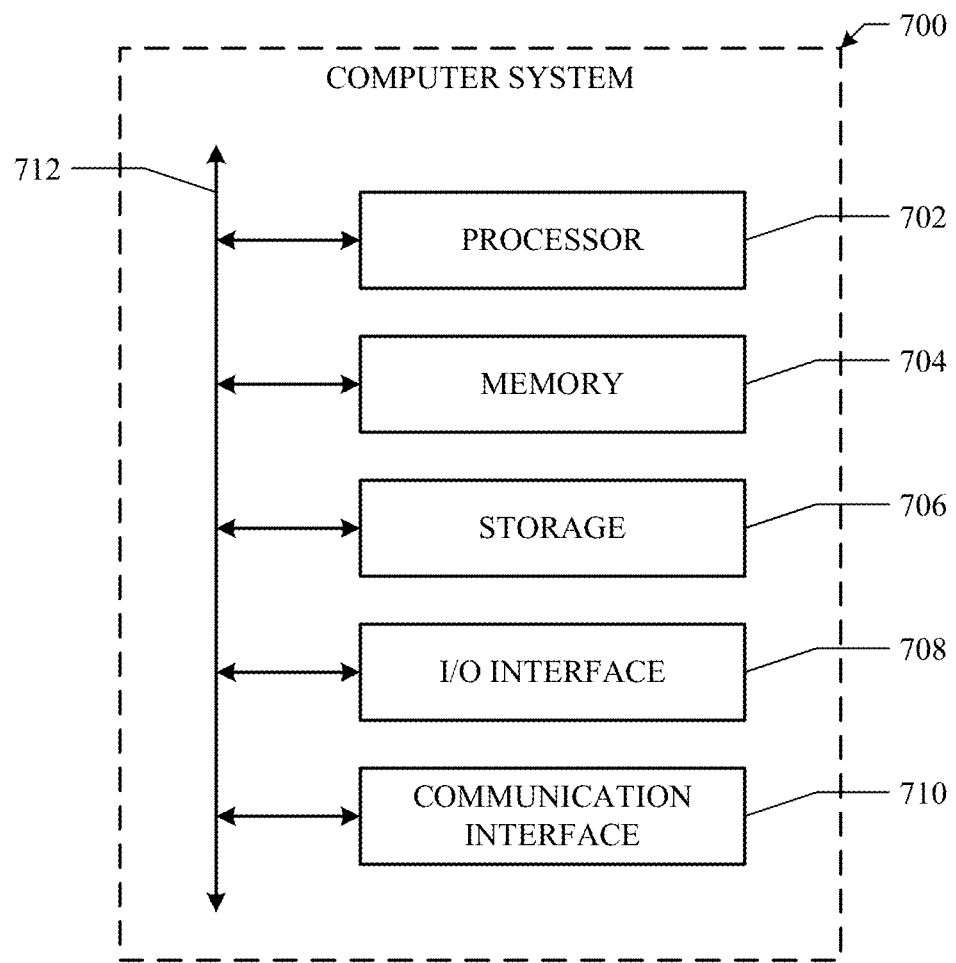
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by one or more computer server machines, receiving, via a messaging application associated with a social-networking system, a command message for one or more connected devices of a user from a client device associated with the user;
   by the server machines, parsing the command message;
   by the server machines, accessing a device graph to identify a plurality of connected devices associated with the user, wherein the device graph comprises:
     a first node representing the user,
     a plurality of second nodes representing the plurality of connected devices, and
     edges representing interactions between the user and the plurality of connected devices;
   by the server machines, determining, based on the parsed command message, an execution context for inferring the one or more connected devices of the user from the plurality of connected devices identified from the device graph that the user of the client device intents intends to send instructions to corresponding to the command message, wherein the execution context comprises:
     an interaction history of the user with the one or more connected devices, and
     a current location of the user;
   by the server machines, identifying, based on the interaction history of the user with the one or more connected devices of the user and the current location of the user, one or more of the plurality of connected devices for sending instructions to corresponding to the command message from the user, wherein the plurality of connected devices of the user are located within a threshold proximity to the client device of the user;
   by the server machines, determining, based on the parsed command message, one or more instructions for the identified connected devices; and
   by the server machines, sending the instructions to the identified connected devices.

2. The method of claim 1, wherein the
   identifying the one or more of the plurality of connected devices is further based at least in part on determining the first node representing the user is within a threshold degree of separation of one or more of the second nodes representing the respective one of the connected devices.

3. The method of claim 1, further comprising updating the device graph to add an edge connecting the first node representing the user with one or more second nodes each representing the respective one of the identified connected devices.

4. The method of claim 1, further comprising:
   parsing the command message to identify one or more n-grams; and
   identifying the one or more of the plurality of connected devices based at least in part on one or more of the identified n-grams matching one or more of the second nodes representing the respective one of the connected devices.

5. The method of claim 1, wherein the identifying further comprises matching one or more of the second nodes representing the respective one of the connected devices to the first node representing the user by an edge corresponding to a setting or action associated with the respective one of the connected devices.

6. The method of claim 1, wherein the messaging application associated with the social-networking system is executed on the client device.

7. The method of claim 1, wherein the command message comprises a natural language message sent by the messaging application.

8. The method of claim 1, the command message comprises a voice-transcribed message sent by the messaging application.

9. The method of claim 1, further comprising determining, based on the parsed command message and for each of the identified connected devices, a respective set of instructions for the connected device.

10. The method of claim 1, wherein the execution context further comprises:
    a level of authorization for the user; or
    permissions or privacy settings configured for one or more of the identified connected devices.

11. The method of claim 1, further comprising:
    receiving a device message from one or more of the connected devices;
    generating a natural-language message based on the device message;
    identifying one or more client devices, wherein each of the identified client devices is associated with the user; and
    sending the natural-language message to the identified client devices.

12. The method of claim 11, wherein the natural-language message comprises:
    a status message relating to one or more of the connected devices;
    a request for additional information to clarify a command message;

a request to authenticate the user;
a message acknowledging the command message or confirming completion of the instructions;
a message stating that the instructions cannot be executed; or
an alert regarding one or more of the connected devices.

13. The method of claim 1, wherein the identified one or more of the plurality of connected devices are associated with the current location of the user.

14. One or more computer-readable non-transitory storage media embodying software configured when executed to:
receive, via a messaging application associated with a social-networking system, a command message for one or more connected devices of a user from a client device associated with the user;
parse the command message;
access a device graph to identify a plurality of connected devices associated with the user, wherein the device graph comprises:
a first node representing the user,
a plurality of second nodes representing the plurality of connected devices, and
edges representing interactions between the user and the plurality of connected devices;
determine, based on the parsed command message, an execution context for inferring the one or more connected devices of the user from the plurality of connected devices identified from the device graph that the user of the client device intends to send instructions to corresponding to the command message, wherein the execution context comprises:
an interaction history of the user with the one or more connected devices, and
a current location of the user;
identify, based on the interaction history of the user with the one or more connected devices of the user and the current location of the user, one or more of the plurality of connected devices for sending instructions to corresponding to the command message from the user, wherein the plurality of connected devices of the user are located within a threshold proximity to the client device of the user;
determine, based on the parsed command message, one or more instructions for the identified connected devices; and
send the instructions to the identified connected devices.

15. The media of claim 14, wherein the software is further configured to:
identify the one or more of the plurality of connected devices based at least in part on determining the first node representing the user is within a threshold degree of separation of one or more of the second nodes representing the respective one of the connected devices.

16. The media of claim 14, wherein the software is further configured to update the device graph to add an edge connecting the first node representing the user with one or more second nodes each representing the respective one of the identified connected devices.

17. The media of claim 14, wherein the software is further configured to:
parse the command to identify one or more n-grams; and
identify the one or more of the plurality of connected devices based at least in part on one or more of the identified n-grams matching one or more of the second nodes representing the respective one of the connected devices.

18. A device comprising:
one or more processors; and
one or more computer-readable non-transitory storage media coupled to the processors and embodying software configured when executed to:
receive, via a messaging application associated with a social-networking system, a command message for one or more connected devices of a user from a client device associated with the user;
parse the command message;
access a device graph to identify a plurality of connected devices associated with the user, wherein the device graph comprises:
a first node representing the user,
a plurality of second nodes representing the plurality of connected devices, and
edges representing interactions between the user and the plurality of connected devices;
determine, based on the parsed command message, an execution context for inferring the one or more connected devices of the user from the plurality of connected devices identified from the device graph that the user of the client device intends to send instructions to corresponding to the command message, wherein the execution context comprises:
an interaction history of the user with the one or more connected devices, and
a current location of the user;
identify, based on the interaction history of the user with the one or more connected devices of the user and the current location of the user, one or more of the plurality of connected devices for sending instructions to corresponding to the command message from the user, wherein the plurality of connected devices of the user are located within a threshold proximity to the client device of the user;
determine, based on the parsed command message, one or more instructions for the identified connected devices; and
send the instructions to the identified connected devices.

19. The device of claim 18, wherein the software is further configured to:
identify the one or more of the plurality of connected devices based at least in part on determining the first node representing the user is within a threshold degree of separation of one or more of the second nodes representing the respective one of the connected devices.

20. The device of claim 18, wherein the software is further configured to update the device graph to add an edge connecting the first node representing the user with one or more second nodes each representing the respective one of the identified connected devices.

* * * * *